US012506525B2

(12) United States Patent
Alizadeh et al.

(10) Patent No.: US 12,506,525 B2
(45) Date of Patent: Dec. 23, 2025

(54) MULTI-LINK OPERATIONS-BASED WIFI SENSING AND RANGING

(71) Applicant: Cisco Technology, Inc., San Jose, CA (US)

(72) Inventors: Ardalan Alizadeh, Milpitas, CA (US); Peiman Amini, Fremont, CA (US); Matthew A. Silverman, Shaker Heights, OH (US); Laurent A. Pierrugues, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 464 days.

(21) Appl. No.: 18/063,576

(22) Filed: Dec. 8, 2022

(65) Prior Publication Data

US 2024/0014871 A1    Jan. 11, 2024

Related U.S. Application Data

(60) Provisional application No. 63/368,000, filed on Jul. 8, 2022.

(51) Int. Cl.
*H04B 7/06* (2006.01)

(52) U.S. Cl.
CPC .......... *H04B 7/0626* (2013.01); *H04B 7/066* (2013.01)

(58) Field of Classification Search
CPC .............................. H04B 7/0626; H04B 7/066
See application file for complete search history.

(56) References Cited

U.S. PATENT DOCUMENTS

| 2018/0191527 | A1* | 7/2018 | Zhu | H04L 5/14 |
| 2021/0075523 | A1* | 3/2021 | Wang | H04L 5/0044 |
| 2022/0005337 | A1* | 1/2022 | Shin | G08B 21/043 |
| 2022/0006497 | A1* | 1/2022 | Park | H04B 7/0626 |

(Continued)

FOREIGN PATENT DOCUMENTS

WO    WO-2023201015 A1 * 10/2023   ............. G06N 3/044

OTHER PUBLICATIONS

Kazaz et al., "Delay Estimation for Ranging and Localization Using Multiband Channel State Information", https://arxiv.org/pdf/2111.10682.pdf.

(Continued)

*Primary Examiner* — Asad M Nawaz
*Assistant Examiner* — Hugh Mark Ashley
(74) *Attorney, Agent, or Firm* — Patterson + Sheridan, LLP

(57) ABSTRACT

Techniques for enhanced wireless sensing or ranging are provided. First and second channel state information (CSI) data, for a first and second link of a plurality of links in a multi-link operation (MLO) system, is collected. A set of channel parameters is estimated, based on the second CSI data, using a channel propagation model. First predicted CSI data for the first link is generated based on the estimated set of channel parameters. The first CSI data is calibrated based on the first predicted CSI data, comprising determining at least one of an amplitude difference or a phase difference between the first CSI data and the first predicted CSI data. Aggregated CSI data is generated based on the calibrated first CSI data and the second CSI data, and at least one of wireless sensing or wireless ranging is performed based on the aggregated CSI data.

20 Claims, 8 Drawing Sheets

(56) References Cited

U.S. PATENT DOCUMENTS

2022/0225217 A1    7/2022  Silverman et al.
2022/0286179 A1*   9/2022  Hosseini ............... H04W 72/20

OTHER PUBLICATIONS

Ele Times, "Wi-Fi 7-More Than Just Extremely High Throughput", Jul. 8, 2022, https://www.eletimes.com/wi-fi-7-more-than-just-extremely-high-throughput.
Yongsen Ma et al., "Wifi Sensing with Channel State Information: A Survey", ACM Comput. Surv.., vol. 1, No. 1, Article 1, Jan. 2019.
Pu Wang et al., "Multi-Band WiFi Fusion for WLAN Sensing", Mar. 9, 2021, <https://mentor.ieee.org/802.11/dcn/21/11-21-0407-00-00bf-multi-band-wifi-fusion-for-wlan-sensing.pptx>.
Yu et al., "Multi-Band Wi-Fi Sensing with Matched Feature Granularity", <https://arxiv.org/pdf/2112.14006>.
Vasisht et al., "Eliminating Channel Feedback in Next-Generation Cellular Networks", SIGCOMM '16, Aug. 22-26, 2016, pp. 398-411.
Xie et al., "Precise Power Delay Profiling with Commodity WiFi", MobiCom '15, Sep. 7-11, 2015.
Wang et al., "UL-CSI Data Driven Deep Learning for Predicting DL-CSI in Cellular FDD Systems", IEEE Access, vol. 7, 2019, pp. 96105-96112.
LAN/MAN Standards Committee, IEEE P802.11be™/D1.0, "Draft Standard for Information technology—Telecommunications and information exchange between systems Local and metropolitan area network—Specific requirements", 635 pgs.

* cited by examiner

MULTI-LINK OPERATIONS-BASED WIFI SENSING AND RANGING

CROSS-REFERENCE TO RELATED APPLICATIONS

This application claims benefit of U.S. provisional patent application Ser. No. 63/368,000 filed Jul. 8, 2022. The aforementioned related patent application is herein incorporated by reference in its entirety.

TECHNICAL FIELD

Embodiments presented in this disclosure generally relate to wireless sensing and ranging. More specifically, embodiments disclosed herein relate to improved sensing and ranging in multi-link operation systems.

BACKGROUND

Recently, WiFi usage has expanded from simply providing connectivity to conventional computing devices (e.g., desktops, laptops, and mobile devices) to additionally enabling Internet and network connectivity to smart and Internet of things (IoT) devices. Such an expansion has resulted in the exponential growth of the available WiFi devices and the nearly ubiquitous coverage of WiFi networks. This expansion of wireless networks can enable uses beyond providing network communication, such as by providing sensing of the surrounding physical environment and/or providing location services for devices.

Wireless networks can be used in various motion-based or location-based applications and services. For example, the multipath channel dynamics of the medium can be evaluated to provide sensing and round trip time-based localization/ranging. However, the usage of these techniques is highly dependent on the availability of large bandwidth channels to provide high resolution to distinguish between two delay taps. Because of the interferences and daily activities in the network (especially in dense enterprise deployments), such large bandwidths are frequently unavailable for such usages.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
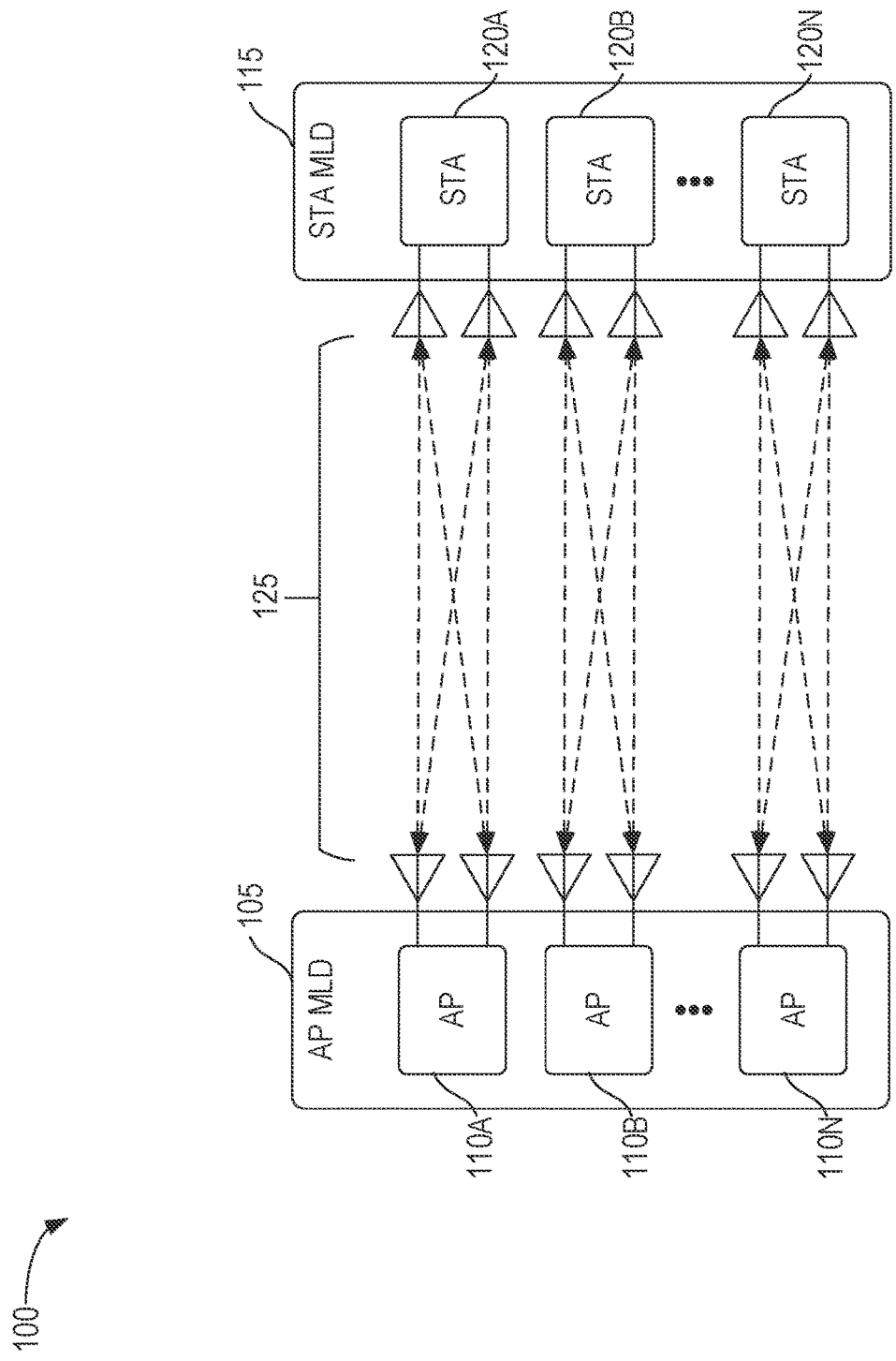
FIG. 1 depicts an example environment for enhanced sensing and/or ranging multi-link operations, according to one embodiment.

One embodiment presented in this disclosure provides a method, comprising: collecting first channel state information (CSI) data for a first link of a plurality of links in a multi-link operation (MLO) system; collecting second CSI data for a second link of the plurality of links; estimating a set of channel parameters, based on the second CSI data, using a channel propagation model; generating first predicted CSI data for the first link based on the estimated set of channel parameters; calibrating the first CSI data based on the first predicted CSI data, comprising determining at least one of (i) an amplitude difference or (ii) a phase difference between the first CSI data and the first predicted CSI data; generating aggregated CSI data based on the calibrated first CSI data and the second CSI data; and performing at least one of (i) wireless sensing or (ii) wireless ranging based on the aggregated CSI data.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods

Example Embodiments

In embodiments of the present disclosure, channel state information (CSI) in multi-link operation (MLO) systems can be calibrated and aggregated to enable efficient evaluation of the channel impulse responses across multiple links in order to provide higher granularity of the delay profile, thereby enabling various services such as wireless sensing and ranging using reduced bandwidth, as compared to conventional systems.

MLO generally involves transmitting and/or receiving data using multiple different frequency bands or channels, either simultaneously or sequentially. For example, multi-link devices (MLDs) may engage in MLO and communicate using the 2.4 GHz band, the 5 GHz band, and/or the 6 GHz band. Generally, embodiments of the present disclosure can be readily used in conjunction with any MLO technology, including multi-link single radio (MLSR) operations, where the transmission and receiving are performed using one radio at different times, enhanced MLSR (eMLSR) operations, which enhances MLSR with a reduced function radio to choose the best link, non-simultaneous transmission and receiving multi-link multi-radio (Non-STR MLMR), where the MLO is able to simultaneously receive and transmit over multiple radios (under certain constraints, such as with respect to frequency separation and aligned transmission/ reception), STR MLMR, where simultaneous reception and transmission over multiple radios can be performed without constraints, and the like.

In an embodiment, CSI data from MLO links can be evaluated to determine the channel impulse response and power delay profile, which fully characterizes the multipath channel, and can be used in various motion-based and/or location-based services. For example, the multipath channel dynamics can be unveiled or determined using consecutive measures of the power delay profile (e.g., tracking the power delay profile changes in the multipath channel). In this way, the system can detect objects, as well as object movement, such as a person walking, falling, talking, making gestures, and the like. In addition, in some embodiments, the power level measured from each signal path can be used to estimate the path length (e.g., thereby providing ranging between objects or pairs of devices).

In some embodiments, for the 20 MHz bandwidth (which is widely used, such as in 802.11), the power delay profile resolution is up to 50 ns, which results in a 15 meter resolution in measuring the multipath lengths. Such a resolution imposes inevitable and significant uncertainty in ranging, mobility detection, gesture recognition, or localization. For a finer-grained detection (e.g., less than 1.5 m uncertainty) to better differentiate objects and movements, at least 200 MHz bandwidth may be needed. However, such bandwidth is generally not available in conventional systems. In embodiments of the present disclosure, by dynamically aggregating data from multiple links, the system can effectively provide accurate sensing and ranging using relatively narrow bandwidths.

In an embodiment, the estimated channels (e.g., CSI data) from a first link in the MLO system can be dynamically calibrated to unify the inter-link amplitude and/or phase rotations with a second link. In some embodiments, a channel propagation model is generated and one or more channel parameters can be estimated based on the CSI of a given link. This model can then be used to predict the CSI of a second link, and the differences between the predicted CSI and the estimated/observed CSI of the second link can be used to drive dynamic calibration of the CSI data, such that it can be aggregated with the data from the first link.

In some embodiments, to enable such aggregation, the calibrated or adjusted CSI data can be upsampled to account for the increased effective bandwidth, as discussed in more detail below. In one embodiment, the upsampled data can then be processed using one or more domain transformation functions (e.g., an inverse fast Fourier transform (iFFT) operation) to convert the CSI data from the frequency domain to the time domain, thereby generating a power delay profile (also referred to in various embodiments as a delay profile, impulse responses, delay taps, channel taps, and the like) that gives the intensity of the signal received through the multipath channel as a function of time delay (e.g., the difference in travel time between multipath arrivals) for each link. As discussed above, these power delay profiles can be used to perform sensing and ranging.

In an embodiment, due to the above-discussed calibration, the power delay profile generated for each link in the MLO can then be combined or aggregated (e.g., summed) to yield aggregated power delay information that enables more fine-grained and accurate analysis (e.g., more accurate sensing and/or ranging).

FIG. 1 depicts an example environment 100 for enhanced sensing and/or ranging multi-link operations, according to one embodiment. In the illustrated environment 100, an AP MLD 105 (e.g., an access point that acts as a multilink device) is communicatively coupled with a STA MLD 115 (e.g., a station or client device acting as a multilink device) via a set of links 125. In some embodiments, the links 125 correspond to wireless connections. In some embodiments, a link 125 exists between each antenna of the AP MLD 105 and each antenna of the STA MLD 115. In the illustrated example, links 125 exist between each AP 110 and a corresponding STA 120. For example, the AP 110A has one or more links connecting it to the STA 120A, AP 110B and STA 120B are connected by one or more links, and so on. That is, each linked AP/STA pair may operate using a different frequency, as compared to other AP/STA pairs. For example, the AP 110A and STA 120A may use a first frequency band (e.g., 2.4 GHz) while AP 110B and STA 120B use a second band (e.g., 5 GHz).

The AP MLD 105 and STA MLD 115 are generally representative of any device capable of performing multilink operations. Although an AP MLD 105 and STA MLD 115 are depicted for conceptual clarity, in embodiments, the MLO may be performed between any MLDs, including multiple AP MLDs, multiple STA MLDs, or any other MLDs.

As illustrated, the AP MLD 105 includes a number of individual APs 110A-N, where each AP 110A-N has one or more antenna. Although three APs 110 are depicted for conceptual clarity, in embodiments, the AP MLD 105 may use any number of APs 110 (including one). Similarly, though the APs 110 each have two antenna in illustrated example, in embodiments, each AP 110 may have any number of antenna (including one). Additionally, in the illustrated embodiment, the STA MLD 115 includes a number of individual STAs 120A-N, where each STA 120A-N has one or more antenna. Although three STAs 120 are depicted for conceptual clarity, in embodiments, the STA MLD 115 may use any number of STAs 120 (including one). Similarly, though the STAs 120 each have two antenna in illustrated example, in embodiments, each STA 120 may have any number of antenna (including one).

In some embodiments of the present disclosure, AP MLDs 105 and STA MLDs 115 may generally be referred to collectively as "MLDs" or "multilink devices," indicating that they are capable of using multiple communication links 125 (whether using one link at a time, or using multiple links in parallel to transmit and receive data). Additionally, in some embodiments, the AP MLD 105 may be generally referred to as simply an "AP," and the STA MLD 115 may generally be referred to as simply a "STA" or "client device." Generally, the AP MLD 105 corresponds to an access point device that provides connectivity to a local wireless network (e.g., WiFi), while the STA MLD 115 corresponds to a station or client device connected to the local wireless network via the AP MLD 105.

In the illustrated embodiment, CSI may be collected or estimated (referred to as channel estimation in some embodiments) for one or more links 125 in the MLO communication. That is, for each link 125 between an AP 110 and a STA 120, one or more devices (e.g., the AP MLD 105, the STA MLD 115, and/or a third component, such as a controller) may perform channel estimation to generate CSI for the link 125 (e.g., for each subcarrier included in the link 125). In at least one embodiment, the CSI indicates, for each subcarrier (e.g., for each frequency in the link 125), a corresponding amplitude of the received signal.

In an embodiment, as discussed in more detail below, one or more devices can use channel propagation model(s) to estimate or infer environmental parameters based on the CSI from a first link 125, allowing the channel to be characterized. This model can then be used, with the estimated channel parameters, to generate predicted CSI for a second link 125. As discussed below, the predicted CSI for the second link 125 can then be compared against the generated or actual CSI for the second link in order to identify amplitude differences, phase differences, and the like. The CSI data for the second link can then be calibrated based on the determined differences, and the calibrated CSI from the second link can then be aggregated with the estimated or generated CSI for the first link.

This aggregated CSI data can thereby enable improved wireless sensing and/or ranging. For example, the aggregated data may be used to estimate the distance between the AP MLD 105 and the STA MLD 115, to sense or detect the presence and/or movement of objects in the space (e.g., humans, animals, cars, etc.), and the like.

In some embodiments of the present disclosure, CSI calibration and aggregation between two links is discussed for conceptual clarity. That is, for clarity, some embodiments discuss calibrating data from a first link to a second link, and aggregating this data for the two links. However, embodiments of the present disclosure are readily applicable to calibrating and aggregating data corresponding to any number of links.

Figure 2:
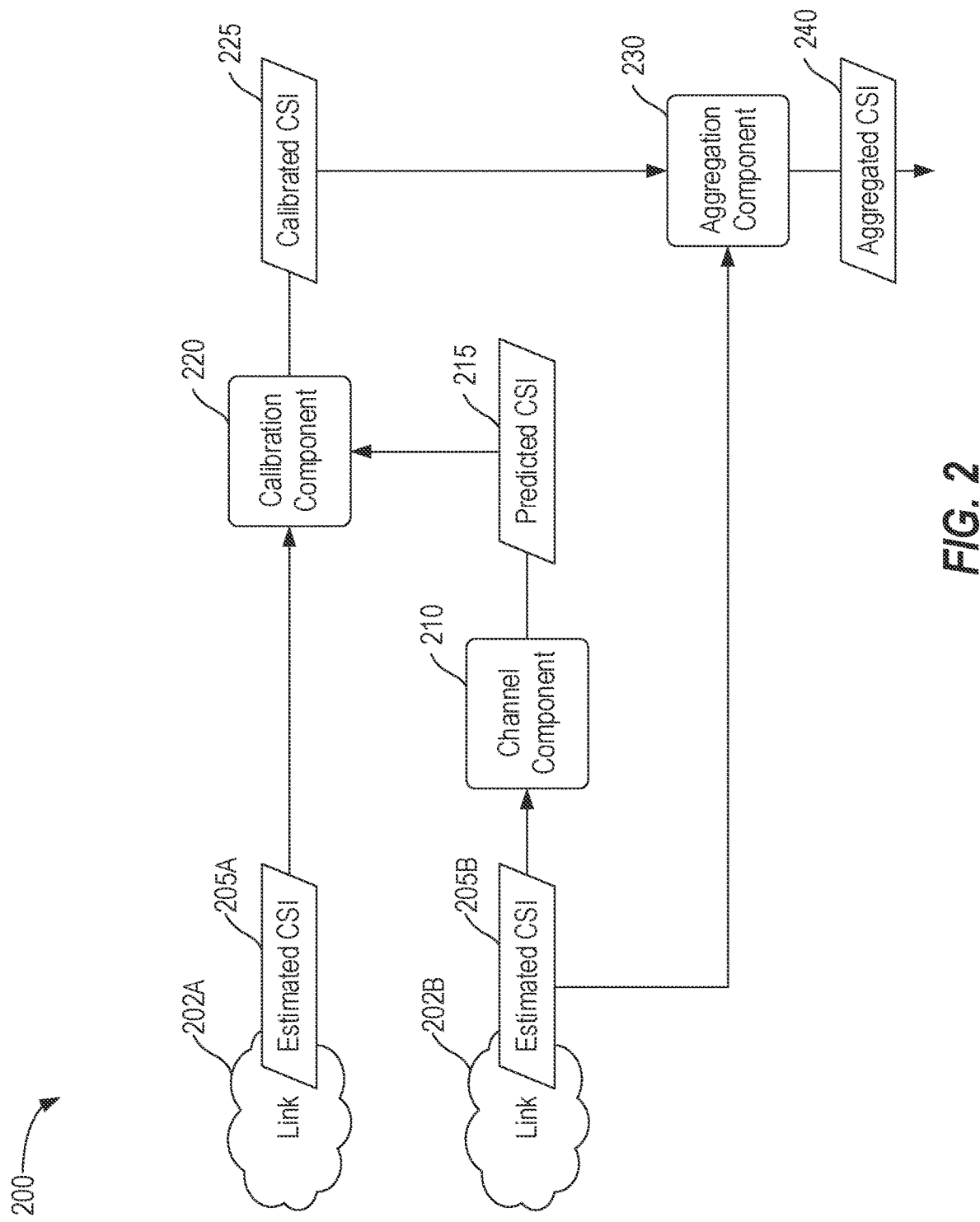
FIG. 2 depicts an example workflow for calibrating and aggregating channel state information (CSI) data in multi-link communications, according to one embodiment.

FIG. 2 depicts an example workflow 200 for calibrating and aggregating CSI data in multi-link communications, according to one embodiment. In on embodiment, the workflow 200 is performed by an AP, such as AP MLD 105 of FIG. 1, and/or by a client device, such as STA MLD 115 of FIG. 1.

In the illustrated embodiment, estimated CSI 205 is evaluated and processed by a channel component 210, a calibration component 220, and an aggregation component 230 to generate aggregated CSI 240. Although depicted as discrete components for conceptual clarity, in embodiments, the operations of the channel component 210, calibration component 220, and aggregation component 230 may be combined or distributed across any number of components. Further, the operations of the channel component 210, calibration component 220, and aggregation component 230 may be implemented using hardware, software, or a combination of hardware and software.

As illustrated, estimated CSI 205 is generated, estimated, collected, or otherwise accessed for two or more links 202 in an MLO system. That is, the estimated CSI 205A may correspond to a first link 202A of a plurality of links used in the MLO, while the estimated CSI 205B corresponds to a second link 202B of the plurality of links. Although evaluation of two links 202 is depicted for conceptual clarity, as discussed above, the system may generally use any number of links. Generally, as discussed above, the estimated CSI 205 may be generated using any suitable operations, such as channel estimation. The estimated CSI 205 generally indicates or refers to the channel properties of the link 202, describing how the signal propagates through the medium. For example, as discussed above, the CSI 205 may indicate, for each subcarrier in the link 202, the amplitude of the received signal.

In the illustrated example, the estimated CSI 205B is accessed and processed by a channel component 210 to generate predicted CSI 215. In one embodiment, the channel component 210 uses one or more channel propagation models to determine, infer, or estimate one or more parameters or characteristics of the radio frequency (RF) medium and/or environment based on the estimated CSI 205B. These parameters can then be used, along with the channel propagation model, to predict the CSI of any other link in the MLO.

In at least one embodiment, the channel component 210 uses a baseband channel propagation model. The baseband channel (e.g., the channel estimate or CSI) $h_i$ received from multiple paths (N) in the i-th antenna of an AP may defined using equation one below, where $\theta_n$ is the angle of arrival of the signal along path n, $d_n$ is the distance traveled by the signal along path n to the antenna, l is the pairwise separation between antennas on the base station, $\lambda$ is the wavelength of the signal (e.g., where $\lambda^{-1}$ is the frequency), $a_n$ is the path attenuation of the n-th path, $j=\sqrt{-1}$, and $\phi_n$ is a frequency-independent phase that captures whether the path is direct or reflected.

$$h_i = \sum_n^N \left( a_n e^{-j2\pi \frac{d_n}{\lambda}} + j\phi_n \right) e^{-j2\pi \frac{il\cos\theta_n}{\lambda}} \quad \text{Equation 1}$$

In experimentation, it has been shown that some channel parameters are quite similar across links, regardless of the center frequencies of the links. For example, multi-band channel sounding has been used to show nearly identical spatial characteristics at various frequencies, and minor differences in the cumulative distribution functions (CDF) of direction of arrival and/or direction of departure or delay spread were observed when measuring the channel at various frequencies. Therefore, in some embodiments, knowledge of the four channel parameters ($a_n$, $\phi_n$, $\theta_n$, and $d_n$), which are frequency-invariant, can be used to predict the baseband channel in any frequency using the propagation model defined in equation one above.

That is, the channel component 210 may use one or more channel measurements (e.g., one or more sets of estimated CSI 205B for the link 202B) from one or more points in time, along with the propagation model, to infer or estimate the indicated channel parameters (e.g., ($a_n$, $\phi_n$, $\theta_n$, and $d_n$)) for the medium at the appropriate A of the signals transmitted on the link 202B from which the estimated CSI 205B was captured.

In an embodiment, the channel component 210 may then use these estimated parameters and the propagation model, in conjunction with a second A corresponding to another link (e.g., the link 202A from which estimated CSI 205A was collected) to compute or generate predicted CSI 215 for the second link 202A.

As illustrated, the predicted CSI 215 (predicted for the link 202A) and estimated CSI 205A (estimated or generated for the link 202A) are then provided to or otherwise accessed by a calibration component 220. In an embodiment, the calibration component 220 is generally configured to evaluate or determine the differences between the estimated CSI 205A and the predicted CSI 215, and calibrate or adjust the estimated CSI 205A based on these differences in order to generate calibrated CSI 225. For example, the calibration component 220 may determine the difference(s) in amplitude, phase, and the like. While some approaches to amplitude and phase correction have operated with the assumption that there is overlap between multiple channels (such that the phases can be modified in a way that the overlapped subcarriers show the same CSI), in aspects of the present disclosure (using MLO links), there is no such overlap. Therefore, the calibration component 220 may use the generated predicted CSI 215.

In an embodiment, the amplitude of the estimated CSI 205 from two links may differ due to factors such as different low noise amplifier (LNA) and/or automatic gain control (AGC) gains. Additionally, the transmission power and path loss in the two links may differ. In an embodiment, normalization or calibration of the estimated CSI 205A based on the predicted CSI 215 (as opposed to normalizing it based on the estimated CSI 205B or some other values) can result in a more-equivalent amplitude. That is, more simplistic normalization does not account for the possibility of having one link in deeper fading than the other, and the number of samples (e.g., subcarriers) may not be statistically sufficient for such normalization. However, calibration can be accurately performed using the predicted CSI 215.

In some embodiments, as the amplitude is not a function of subcarrier, only a single estimate need be calculated based on the mean of the difference between the predicted CSI 215 and the estimated CSI 205A, such as by using equation two below, where $h_{estimated}$ is the measured/estimated channel (e.g., estimated CSI 205A) and $h_{predicted}$ is the predicted channel (e.g., predicted CSI 215).

$$\text{difference}_{amplitude} = \text{mean}(\text{sum}(\text{abs}(h_{estimated}) - \text{abs}(h_{predicted})))$$

Equation 2

In some embodiments, the phases of the predicted CSI 215 and estimated CSI 205A may differ due to a variety of reasons, including the RF front-ends having different group delays, different clock offsets, and the like which result in a rotated version of the channel. In some embodiments, the phase rotation of the signal is a function of subcarrier k according to equation three below, where $\phi_k$ is the phase of subcarrier k (e.g., determined based on how the packet/signal is sampled), $\theta_k$ is the actual phase rotation of the channel (e.g., introduced by the over-the-air channel, such as the reflections, multipath, and the like), $\lambda_b$ and $\lambda_o$ are rotations from sample time alignment error and/or difference and sampling frequency offset, and $\beta$ is the fixed phase error due to carrier frequency offset.

$$\phi_k = \theta_k + k(\lambda_b + \lambda_o) + \beta$$

Equation 3

In some embodiments, a least square estimator (over the frequency/subcarrier domain) can be used to provide or determine the slope $(k(\lambda_b+\lambda_o)+)$ and intercept $(\theta_k+\beta)$. In some embodiments, to extract $\theta_k$ from the carrier frequency offset ($\beta$), the system may collect and calculate or determine the intercept over two sets of estimated CSI 205A. Then, $\theta_k$ can be estimated via a system of equations having two equations (e.g., two instances of equation three) with two unknowns.

The calibration component 220 can thereby use the predicted CSI 215 to calibrate the amplitude and/or phase rotation of the estimated CSI 205A from the link 202A to match that of the CSI 205B from the link 202B. In the illustrated workflow 200, the calibrated CSI 225 (for the link 202A) and estimated CSI 205B (for the link 202B) are then provided to or otherwise accessed by an aggregation component 230. The aggregation component 230 can generally aggregate the calibrated and estimated CSI from each link 202 to generate aggregated CSI 240, which is more fine-grained than either original CSI. As discussed above, this enables improved sensing and ranging.

In one embodiment, the aggregation component 230 aggregates the CSI by upsampling it, using one or more domain transformations on it, and/or summing or otherwise aggregating it, as discussed below in more detail.

In at least one embodiment, the channel component 210 may use the propagation model to estimate channel parameters relatively infrequently, as compared to how often aggregated CSI 240 is generated. For example, the channel component 210 may periodically generate estimated channel parameters, and these parameters may be re-used to calibrate estimated CSI for a defined period of time or until one or more criteria are satisfied until new parameters are estimated. Similarly, in some embodiments, the calibration component 220 may use the predicted CSI 215 to determine phase and/or amplitude offsets relatively infrequently, as compared to how often aggregated CSI 240 is generated. For example, the calibration component 220 may periodically determine the differences (e.g., whenever new channel parameters are estimated), and re-use these determined differences to calibrate estimated CSI 205A until the criteria are satisfied.

Although the illustrated workflow 200 depicts calibrating the estimated CSI 205A based on the estimated CSI 205B, in some embodiments, the system may additionally or alternatively calibrate the CSI 205B based on the CSI 205A. Similarly, the system may use the inferred or estimated channel parameters to further calibrate one or more other links in the MLO (e.g., determining a respective phase and/or amplitude offset for each other channel).

In at least one embodiment, the system may determine predicted CSI for each of the links 202, and compare the predicted CSI to estimated CSI for each in order to determine respective differences/offsets (e.g., a phase and/or amplitude difference of link 202A, determined based on CSI 205B from link 202B, as well as a phase and/or amplitude difference of link 202B, determined based on CSI 205A from link 202A). The system may then evaluate these differences to determine whether recalibration is needed. For example, the system may check the mean and/or variance of the residual error between the estimated channel(s) and predicted channel(s) (e.g., between the two predictions, between each prediction and its corresponding estimate, and the like).

Figure 3:
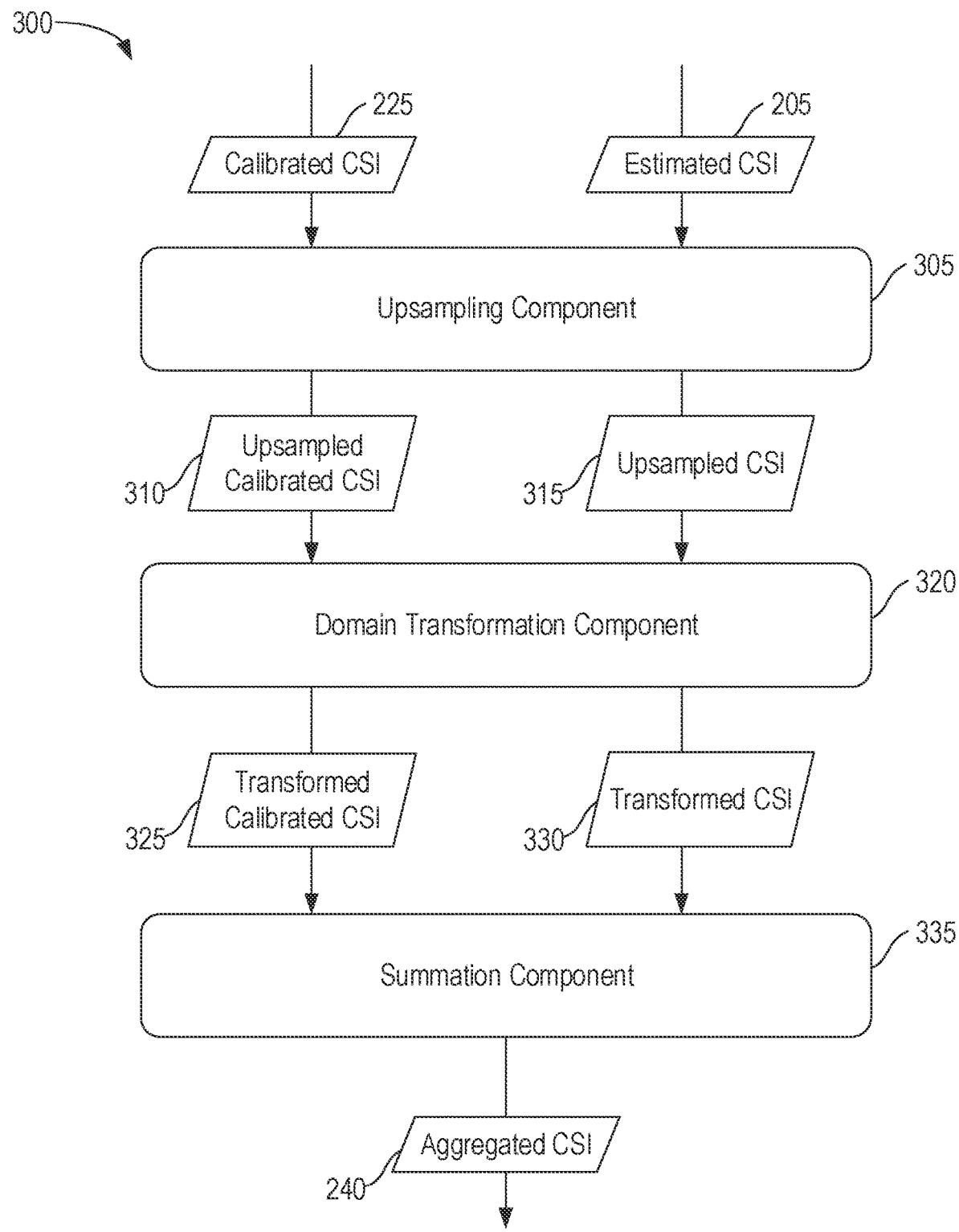
FIG. 3 depicts an example workflow for aggregating CSI data in multi-link communications, according to one embodiment.

FIG. 3 depicts an example workflow 300 for aggregating CSI data in multi-link communications, according to one embodiment. In some embodiments, the workflow 300 provides additional detail for the operations of the aggregation component 230 of FIG. 2. That is, the upsampling component 305, domain transformation component 320, and summation component 335 may be components of the aggregation component 230 of FIG. 2.

In the illustrated embodiment, calibrated CSI 225 and estimated CSI 205 are evaluated and processed by an upsampling component 305, a domain transformation component 320, and a summation component 335 to generate aggregated CSI 240. Although depicted as discrete components for conceptual clarity, in embodiments, the operations of the upsampling component 305, domain transformation component 320, and summation component 335 may be combined or distributed across any number of components. Further, the operations of the upsampling component 305, domain transformation component 320, and summation component 335 may be implemented using hardware, software, or a combination of hardware and software.

In the illustrated example, a set of calibrated CSI 225 (e.g., which may be generated by modifying CSI from a first link, such as link 202A of FIG. 2, based on predicted CSI that was generated based on the CSI from a second link, such as link 202B of FIG. 2) and estimated CSI 205 (e.g., estimated CSI 205B of FIG. 2) are provided to or otherwise accessed by an upsampling component 305.

In the illustrated example, the upsampling component 305 performs an upsampling operation to generate upsampled calibrated CSI 310 based on the calibrated CSI 225, as well as upsampled CSI 315 based on the estimated CSI 205. In one embodiment, the upsampling component 305 can first identify the size of the final samples in time domain. For example, in one embodiment, upsampling component 305 may simply sum up the number of subcarriers in the two links (e.g., the number of subcarriers in the calibrated CSI 225 and the number of subcarriers in the estimated CSI 205). However, this total bandwidth needs to be an integer multiple of the larger bandwidth. For instance, for a 20 MHz bandwidth on a first link (e.g., link 202A of FIG. 2) and a 40 MHz bandwidth on a second link (e.g., link 202B of FIG. 2), the total bandwidth should be 80 MHz (e.g., the CSI for the link 202A should be upsampled by a factor of 4, and the CSI for the link 202B should be upsampled by a factor of 2). If the links have the same bandwidth, the total bandwidth may be defined as twice the bandwidth (if two links are being aggregated).

In some embodiments, to determine the size of the aggregated CSI 240, the upsampling component 305 may determine the number of subcarriers in each link, and determine a shared integer multiple of these numbers (e.g., the smallest value that is an integer multiple of each number). This value can then be used as the target size, and each CSI can be upsampled accordingly to each this bandwidth. In some embodiments, the CSI is upsampled in the frequency domain by padding zeros in between each subcarrier's complex value.

In the illustrated example, the upsampled calibrated CSI 310 and upsampled CSI 315 are then provided to or otherwise accessed by a domain transformation component 320. In an embodiment, the domain transformation component 320 transforms the input CSI from the frequency domain to the time domain, such as by using an inverse fast Fourier transform (iFFT) operation. As discussed above, the resulting transformed calibrated CSI 325 and transformed CSI 330 represent the power delay profiles of the links.

As illustrated, the transformed calibrated CSI 325 and transformed CSI 330 are then provided to or accessed by a summation component 335, which sums or otherwise aggregates them to yield the aggregated CSI 240 (e.g., an aggregated power delay profile).

Figure 4:
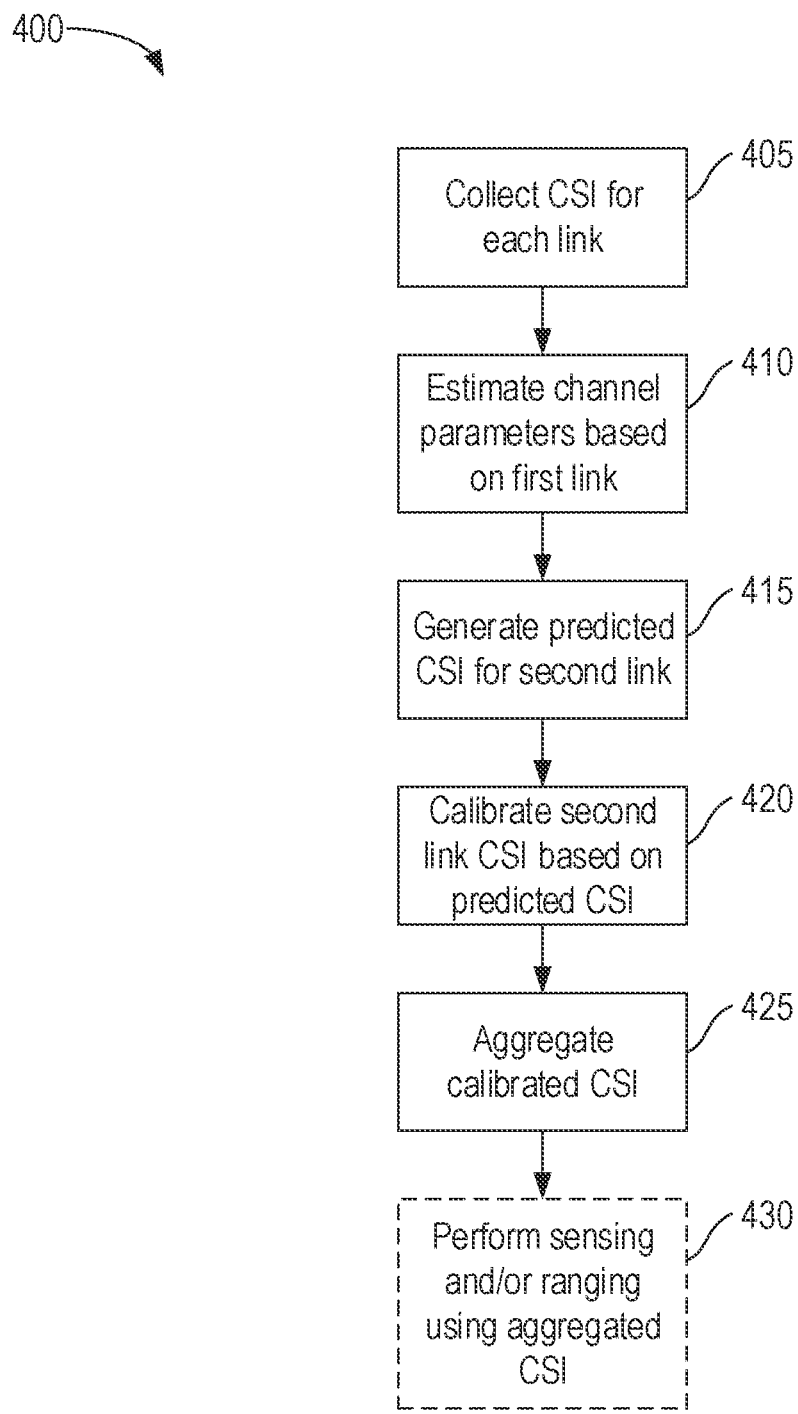
FIG. 4 is a flow diagram depicting an example method for collecting, calibrating, and aggregating CSI in multi-link systems, according to one embodiment.

FIG. 4 is a flow diagram depicting an example method 400 for collecting, calibrating, and aggregating CSI in multi-link systems, according to one embodiment. In some embodiments, the method 400 is performed by an AP, such as AP MLD 105 of FIG. 1, and/or by a client device, such as STA MLD 115 of FIG. 1.

At block 405, the system collects, generates, estimates, or otherwise determines or accesses CSI data for each link of a set of links in an MLO. For example, as discussed above, the AP may use channel estimation on each link to generate respective CSI data (e.g., estimated CSI 205 of FIG. 2) for each respective link (e.g., for each link 202 of FIG. 2). In some embodiments, the AP collects the CSI for each link periodically, upon occurrence of one or more criteria, and the like. For example, the AP may collect the CSI upon determining that a ranging request was received, or that ranging/sensing is otherwise appropriate.

At block 410, the system estimates one or more channel parameters, for the RF medium/physical space, based on the CSI for a first link. For example, as discussed above, the system may use a channel propagation model (e.g., defined by equation one) and CSI data for the first link at one or more points in time to determine, infer, or estimate one or more channel parameters (such as path attenuation, whether the path is direct or reflected, the angle of arrival of the signal, the distance the signal traveled, and the like).

In some embodiments, the system (e.g., the AP) can estimate the channel parameters periodically, or upon occurrence of one or more criteria. For example, the system may estimate the parameters once per hour, once per day, in response to determining that recalibration is needed, and the like. These estimated parameters can then be re-used repeatedly to assist in calibrating CSI data, as discussed above and below.

At block 415, the system generates predicted CSI for a second link, of the set of links in the MLO, based on the estimated channel parameters. For example, as discussed above, the system may use the channel propagation model and the estimated channel parameters to generate predicted CSI data for the second link (e.g., based on the center frequency of the second link, or separately for each subcarrier in the second link based on the center frequency for each subcarrier). As discussed above, in some aspects, these channel parameters may be used multiple times to generate multiple predicted CSI data, either for different links (e.g., for the second, third, and fourth links in the MLO, where the parameters were estimated based on the first link), or for the same link at different times.

At block 420, the system calibrates the CSI data for the second link, of the set of MLO links, using the predicted CSI for the second link (generated based on the estimated channel parameters, which were determined based on the first link). For example, as discussed above, the system may determine amplitude and/or phase changes or differences between the actual estimated CSI for the second link and the predicted CSI for the second link. Based on these differences, in an embodiment, the system can calibrate or modify the CSI of the second link appropriately, such that it can be combined with the CSI from the first link.

Although the illustrated example depicts calibrating the second link's CSI, in some embodiments, the system can additionally or alternatively calibrate the CSI of other links, such as the other link(s) included in the MLO. In at least one embodiment, the system can additionally or alternatively calibrate the CSI of the first link (e.g., based on channel parameters inferred using CSI from the second link or another link).

At block 425, the system then aggregates the calibrated CSI. For example, in some embodiments, the system upsamples the CSI appropriately (e.g., such that the (potentially calibrated) CSI from each link has the same bandwidth/is of the same size (e.g., with the same number of subcarriers) in the frequency domain. In some embodiments, the system can then sum the resulting CSI per sub-carrier, or may use a domain transformation function (e.g., iFFT) to generate power delay profiles for each link. These delay profiles can then be summed on a per-time/per-channel tap basis.

At block 430, the system can then optionally use the aggregated CSI to perform sensing and/or ranging. As discussed above, these sensing and/or ranging operations can generally operate with significantly improved accuracy and/or reliability, as compared to conventional solutions, due to the dynamic data calibration and aggregation.

Figure 5:
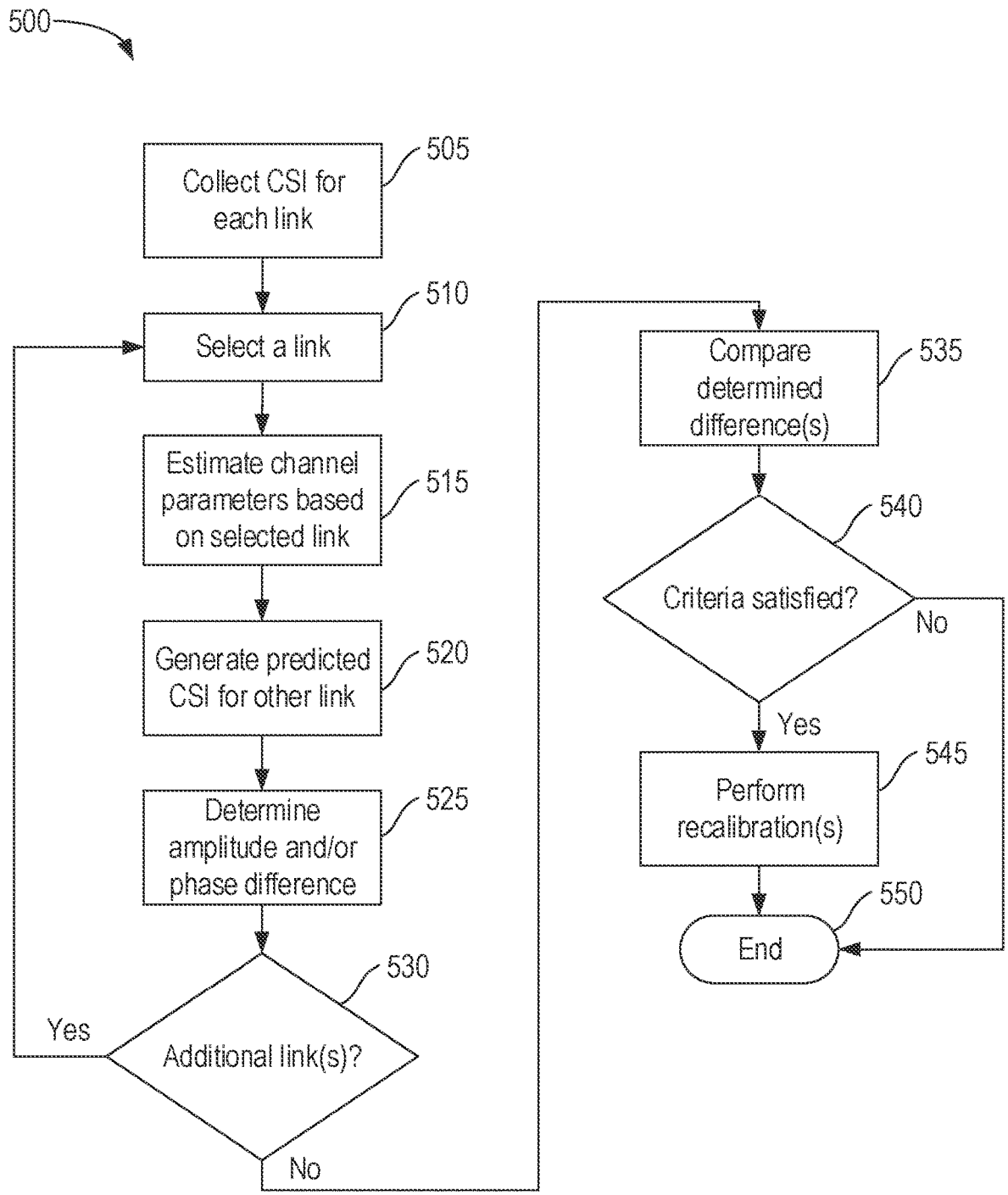
FIG. 5 is a flow diagram depicting an example method for performing recalibration operations in multi-link systems, according to one embodiment.

FIG. 5 is a flow diagram depicting an example method 500 for performing recalibration operations in multi-link systems, according to one embodiment. In some embodiments, the method 500 is performed by an AP, such as AP MLD 105 of FIG. 1, and/or by a client device, such as STA MLD 115 of FIG. 1.

At block 505, the system collects, generates, estimates, or otherwise determines or accesses CSI data for each link of a set of links in an MLO, as discussed above. For example, the AP may use channel estimation on each link to generate respective CSI data (e.g., estimated CSI 205 of FIG. 2) for each respective link (e.g., for each link 202 of FIG. 2). In some embodiments, the AP collects the CSI for each link periodically, upon occurrence of one or more criteria, and the like. For example, the AP may collect the CSI upon determining that a ranging request was received, or that ranging/sensing is otherwise appropriate.

At block 510, the system selects one of the links in the MLO (or one of the links that are aggregated for evaluation). Generally, the system may select the link using any suitable criteria, including randomly or pseudo-randomly, as all such links will be evaluated during the method 500. Additionally, though the illustrated example depicts a sequential process (e.g., selecting and evaluating each link in turn) for conceptual clarity, in some embodiments, the system may evaluate some or all of the links in parallel.

At block 515, the system estimates a set of channel parameters for the channel, based on the selected link. For example, as discussed above, the system may use a channel propagation model and one or more CSI observations for the selected link to estimate one or more channel parameters based on the CSI of the selected link.

At block 520, the system generates predicted CSI data for one or more other links in the MLO, based on the channel parameters. For example, as discussed above, the system may use the channel model and the estimated parameters (estimated based on CSI from a first link) to predict the CSI on a second link.

At block 525, the system then determines the amplitude difference and/or phase difference between the predicted CSI (generated at block 520) for the second link and the actual estimated CSI (determined at block 505) for the second link.

At block 530, the system determines whether there is at least one more link that has not been selected (e.g., that has not been used to estimate channel parameters). If so, the method 500 returns to block 510. If not, the method 500 continues to block 535. In this way, during the method 500, the system can determine or predict amplitude and phase changes for multiple sets of links, in multiple directions.

For example, referring to FIG. 2, the system may use the estimated CSI 205B (from link 202B) to estimate channel parameters, and use these parameters to generate predicted CSI for the link 202A. A first set of differences (also referred to as a first set of calibration information) corresponding to the amplitude and/or phase differences can then be determined by comparing the predicted CSI and the actual estimated CSI 205A. Additionally, the system may use the estimated CSI 205A (from link 202A) to estimate channel parameters, and use these parameters to generate predicted CSI for the link 202B. A second set of differences (also referred to as a second set of calibration information) corresponding to the amplitude and/or phase differences can then be determined by comparing the predicted CSI and the actual estimated CSI 205B.

At block 535, the system compares the determined set(s) of differences/calibration information. For example, continuing the above example, the system may compare the first set of differences (generated using link 202B as the base or index link) to the second set of differences (generated using link 202A as the base or index link) to quantify how they differ. In an embodiment, data such as the magnitude, mean, variance, and other features of the differences between this calibration information for each link can be informative of the quality or reliability of the channel predictions, and therefore, of the calibrated CSI and ultimately of the aggregated CSI.

At block 540, the system determines whether one or more criteria are satisfied. Generally, the specific criteria evaluated may vary, depending on the particular implementation. In at least one embodiment, the system determines whether the magnitude, variance, mean, or other measure of the difference between the calibration information for each link and/or the distance between the sets of calibration information (determined at block 535) meets or exceeds a threshold. If so, the system may determine or infer that the calibration is not sufficiently reliable, and the method 500 continues to block 545. If the comparison does not satisfy the criteria (e.g., the differences are sufficiently close), the method 500 terminates at block 550.

At block 545, the system performs one or more recalibration operations. For example, the system may determine or estimate new channel parameters (as discussed above) to reduce the error or variance in predictions.

Figure 6:
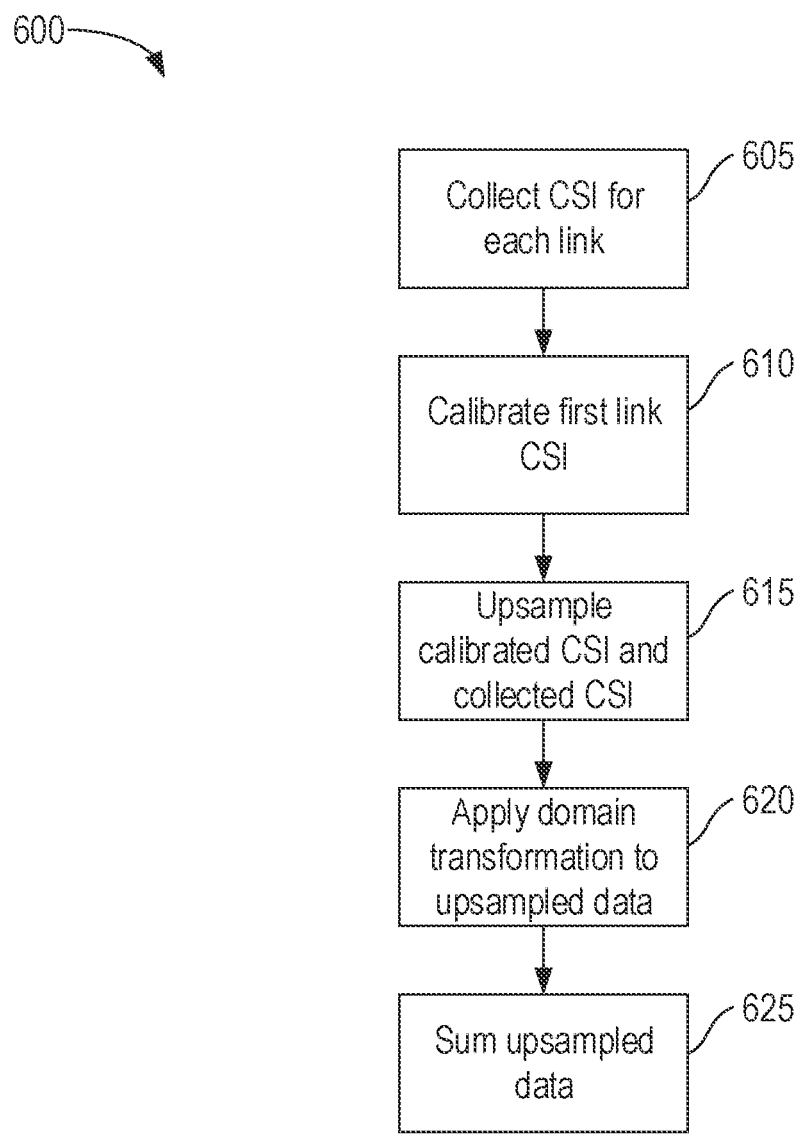
FIG. 6 is a flow diagram depicting an example method for generating and aggregating calibrated CSI data in multi-link systems, according to one embodiment.

FIG. 6 is a flow diagram depicting an example method 600 for generating and aggregating calibrated CSI data in multi-link systems, according to one embodiment. In some embodiments, the method 600 is performed by an AP, such as AP MLD 105 of FIG. 1, and/or by a client device, such as STA MLD 115 of FIG. 1.

At block 605, the system collects, generates, estimates, or otherwise determines or accesses CSI data for each link of a set of links in an MLO (or for each link that will be aggregated), as discussed above. For example, the AP may use channel estimation on each link to generate respective CSI data (e.g., estimated CSI 205 of FIG. 2) for each respective link (e.g., for each link 202 of FIG. 2). In some embodiments, the AP collects the CSI for each link periodically, upon occurrence of one or more criteria, and the like. For example, the AP may collect the CSI upon determining that a ranging request was received, or that ranging/sensing is otherwise appropriate.

At block 610, the system calibrates the CSI data from a first link based on predicted CSI data for the first link, where the predicted CSI was generated using parameters for a channel model that were estimated using CSI from a second link.

At block 615, the system upsamples the calibrated CSI for the first link and the collected CSI for the second link. As discussed above, the system may upsample the CSI such that the calibrated CSI and collected CSI can be aggregated (e.g., via summing) to yield the total bandwidth represented by the aggregate data. For example, if both links are 40 MHz, the system may upsample each CSI by a factor of two (e.g., to reflect that the aggregate CSI represents data for an 80 MHz band). Similarly, as discussed above, if three links are calibrated and/or aggregated (e.g., each having 40 MHz width), the system may upsample each by a factor of three to yield 120 MHz bandwidth.

In at least one embodiment, to determine the upsampling factor, the system can determine the width of each link and/or the number of subcarriers reflected in each set of CSI data. A shared integer multiple (e.g., a value that can be evenly divided by each link's number of subcarriers) can then be determined, and each set of CSI data can be upsampled to meet the size of the shared multiple. In at least one embodiment, the upsampling includes inserting or padding default or predefined values, such as a value of zero, between the subcarriers in the CSI to meet the desired width.

At block 620, the system applies a domain transformation function to each set of upsampled data. For example, in at least one embodiment, the system applies an iFFT operation to transfer the CSI from the frequency domain (e.g., amplitudes per subcarrier) to the time domain (e.g., amplitudes per time or delay tap). In this way, the system generates a set of power delay profiles (e.g., one delay profile for each link in the MLO).

At block 625, the system can then sum the upsampled/transformed CSI data (e.g., sum the delay profiles) on a per-time step basis. In this way, the CSI from multiple non-overlapping links in an MLO system can be efficiently and dynamically calibrated and combined. This aggregated CSI data can be used to enable a variety of more reliable and accurate technologies and operations, such as wireless ranging and sensing.

Figure 7:
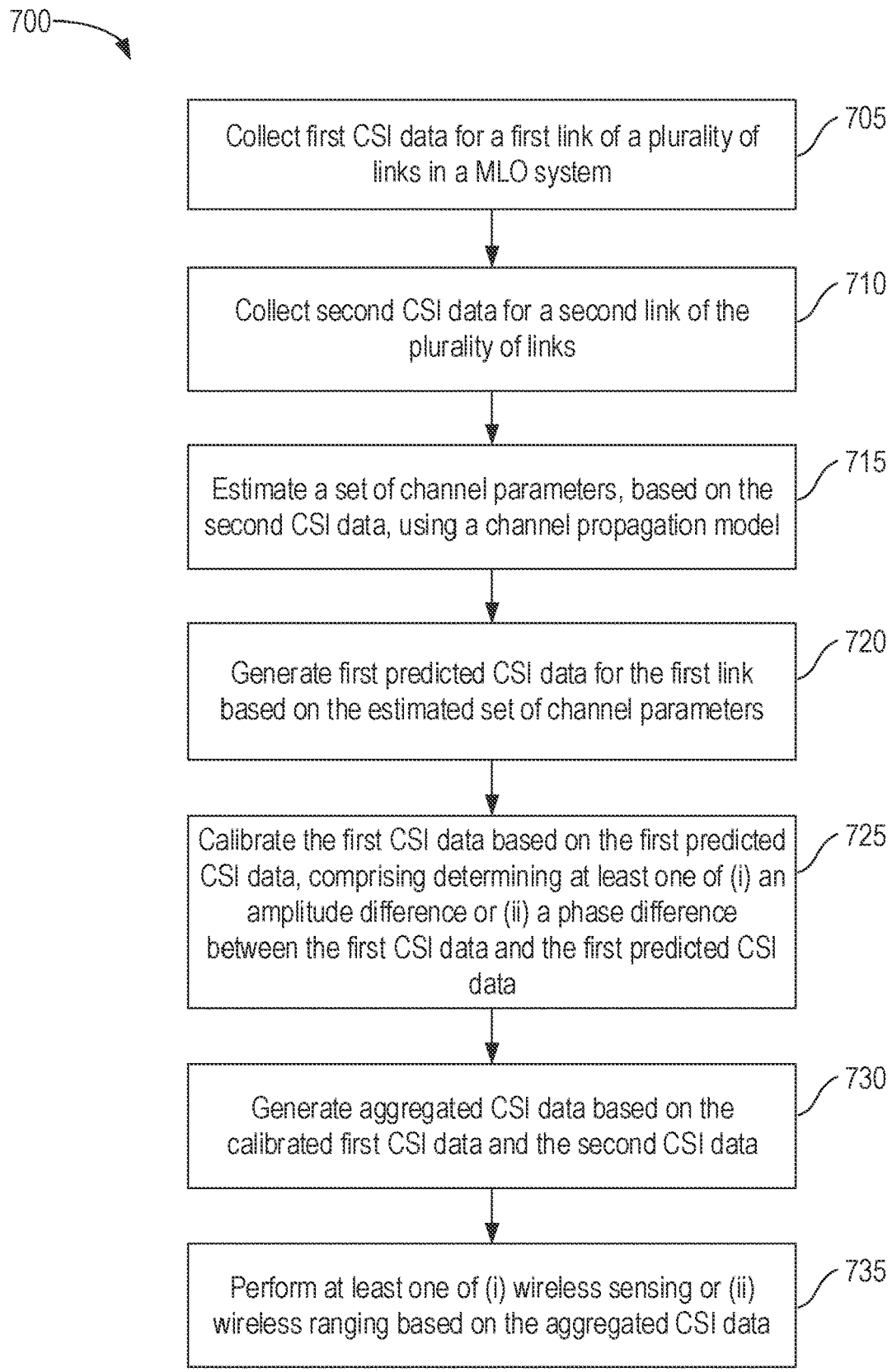
FIG. 7 is a flow diagram depicting an example method for collecting, calibrating, and aggregating CSI in multi-link communications, according to one embodiment.

FIG. 7 is a flow diagram depicting an example method 700 for collecting, calibrating, and aggregating CSI in multi-link communications, according to one embodiment. In some embodiments, the method 700 is performed by an AP, such as AP MLD 105 of FIG. 1, and/or by a client device, such as STA MLD 115 of FIG. 1.

At block 705, first CSI data (e.g., estimated CSI 205B of FIG. 2) for a first link (e.g., estimated link 202B of FIG. 2) of a plurality of links in a MLO system is collected.

At block 710, second CSI data (e.g., estimated CSI 205A of FIG. 2) for a second link (e.g., estimated link 202A of FIG. 2) of the plurality of links is collected.

At block 715, a set of channel parameters is estimated, based on the second CSI data, using a channel propagation model (e.g., by channel component 210 of FIG. 2, using equation one).

At block 720, first predicted CSI data for the first link (e.g., predicted CSI 215 of FIG. 2) is generated based on the estimated set of channel parameters.

At block 725, the first CSI data is calibrated (e.g., to generate calibrated CSI 225 of FIG. 2) based on the first predicted CSI data, comprising determining at least one of (i) an amplitude difference or (ii) a phase difference between the first CSI data and the first predicted CSI data.

At block 730, aggregated CSI data (e.g., aggregated CSI 240 of FIG. 2) is generated based on the calibrated first CSI data and the second CSI data.

At block 735, at least one of (i) wireless sensing or (ii) wireless ranging is performed based on the aggregated CSI data.

Figure 8:
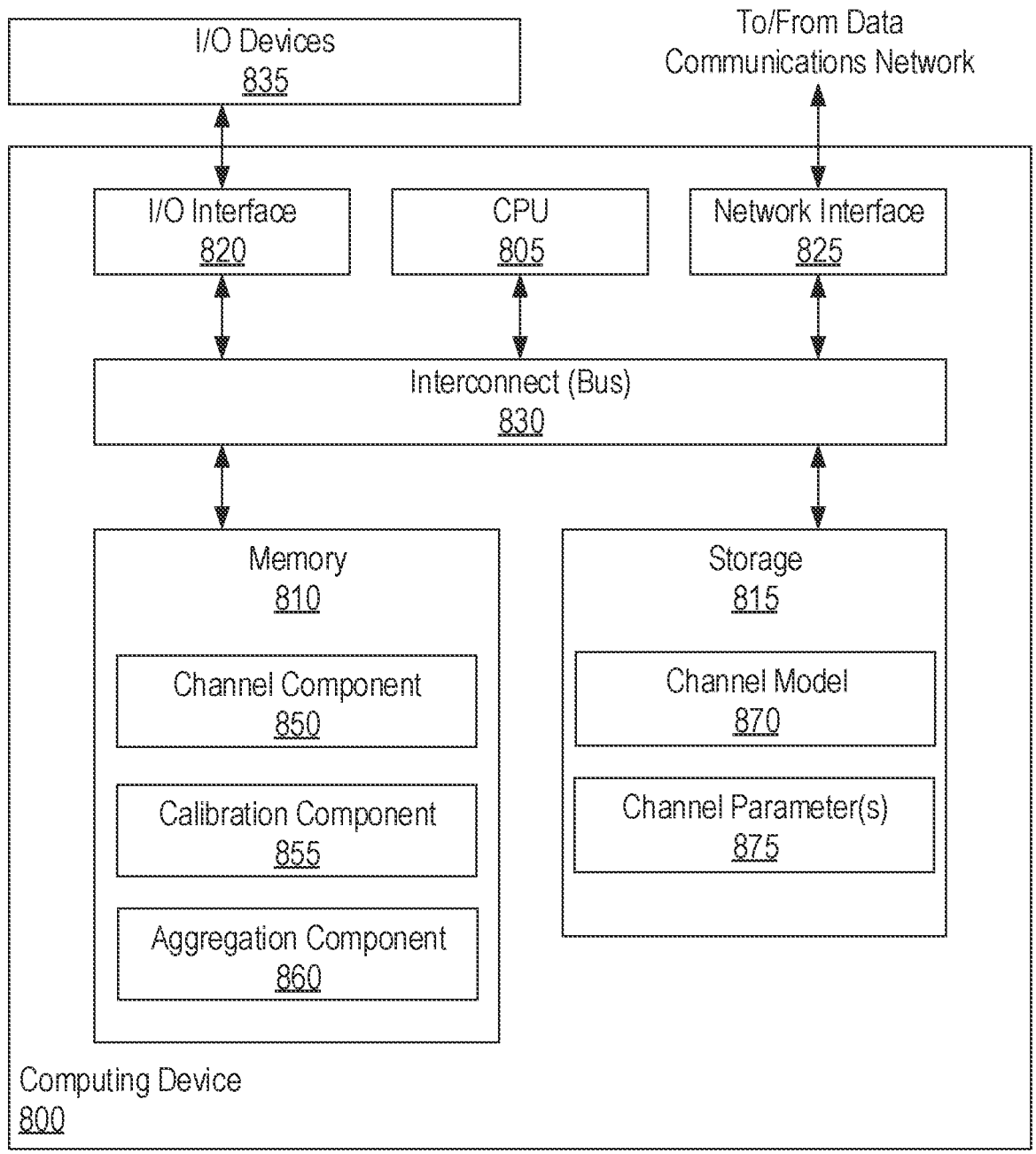
FIG. 8 depicts an example computing device configured to perform various aspects of the present disclosure, according to one embodiment.

FIG. 8 depicts an example computing device 800 configured to perform various aspects of the present disclosure, according to one embodiment. Although depicted as a physical device, in embodiments, the computing device 800 may be implemented using virtual device(s), and/or across a number of devices (e.g., in a cloud environment). In one embodiment, the computing device 800 corresponds to an MLD device, such as the AP MLD 105 of FIG. 1, or the STA MLD 115 of FIG. 1. In some embodiments, the computing device 800 corresponds to a controller for the network, or another device or system.

As illustrated, the computing device 800 includes a CPU 805, memory 810, storage 815, a network interface 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a channel component 850, a calibration component 855, and an aggregation component 860, which may perform one or more embodiments discussed above. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

In one embodiment, the channel component 850 (which may correspond to the channel component 210 of FIG. 2) is used to generate estimated channel parameters (e.g., channel parameters 875) and/or predicted CSI using a channel propagation model (e.g., channel model 870), such as defined using equation one), as discussed above. For example, the channel component 850 may evaluate CSI data from one link to estimate channel parameters (using the channel model 870), then use these estimated parameters and the channel model 870 to predict the CSI data for one or more other links.

Generally, the calibration component 855 (which may correspond to the calibration component 220 of FIG. 2) can be used to determine calibration information (e.g., phase differences and/or amplitude differences) between links in the MLO, as discussed above. For example, the calibration component 855 may compare predicted CSI for a given link (generated using channel parameters 875 estimated based on a different link) to the actual CSI of the given link in order to quantify or determine the differences. These differences may be used as calibration information to calibrate or modify the CSI of the given link to the domain of the different link. In some embodiments, the calibration component 855 may further generate the predicted CSI for a given link based on the channel parameters 875 generated by the channel component 850.

Generally, the aggregation component 860 (which may correspond to the aggregation component 230 of FIG. 2) can be used to aggregate calibrated CSI data, as discussed above. For example, the aggregation component 860 may upsample the data as needed, perform domain transformations if needed or desired, and/or sum the data.

In the illustrated example, the storage 815 includes a channel model 870, and one or more channel parameters 875. In some embodiments, the channel model 870 corresponds to a channel propagation model, such as defined using equation one above. The channel parameters 875 generally correspond to the estimated channel characteristics, as determined by the channel component 850 using the channel model 870. In embodiments, there may be one or multiple sets of channel parameters (e.g., each respective set of parameters estimated based on corresponding CSI data from a respective link). Although depicted as residing in storage 815, the channel model 870 and channel parameters 875 may be stored in any suitable location, including memory 810.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments, and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method, or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A method, comprising:
    collecting first channel state information (CSI) data for a first link of a plurality of links in a multi-link operation (MLO) system;
    collecting second CSI data for a second link of the plurality of links;
    estimating a set of channel parameters for the second link, based on the second CSI data, using a channel propagation model;

generating first predicted CSI data for the first link, based on the estimated set of channel parameters for the second link, using the channel propagation model;

calibrating the first CSI data based on the first predicted CSI data, comprising determining at least one of (i) an amplitude difference or (ii) a phase difference between the first CSI data and the first predicted CSI data;

generating aggregated CSI data based on the calibrated first CSI data and the second CSI data; and performing at least one of (i) wireless sensing or (ii) wireless ranging based on the aggregated CSI data.

2. The method of claim 1, further comprising:
collecting third CSI data for the first link; and
calibrating the third CSI data based on at least one of (i) the amplitude difference or (ii) the phase difference between the first CSI data and the first predicted CSI data.

3. The method of claim 1, further comprising:
estimating a second set of channel parameters, based on the first CSI data, using the channel propagation model;
generating second predicted CSI data for the second link based on the estimated second set of channel parameters;
calibrating the second CSI data based on the second predicted CSI data; and
generating the aggregated CSI data based further on the calibrated second CSI data.

4. The method of claim 3, further comprising:
comparing at least one (i) an amplitude difference or (ii) a phase difference between the first CSI data and the first predicted CSI data and at least one of (i) an amplitude difference or (ii) a phase difference between the second CSI data and the second predicted CSI data; and
determining whether to perform one or more recalibration operations based on the comparison.

5. The method of claim 4, wherein performing the one or more recalibration operations comprises estimating a third set of channel parameters using the channel propagation model.

6. The method of claim 1, further comprising determining both the amplitude difference and the phase difference between the first CSI data and the first predicted CSI data.

7. The method of claim 1, wherein generating the aggregated CSI data comprises:
upsampling the first CSI data and the calibrated second CSI data; and
generating a set of power delay profiles by applying an inverse fast Fourier transform (IFFT) operation to the upsampled first CSI data and the upsampled second CSI data.

8. The method of claim 7, wherein generating the aggregated CSI data further comprises summing the set of power delay profiles.

9. The method of claim 7, wherein upsampling the first CSI data and the calibrated second CSI data comprises:
determining a first number of subcarriers reflected in the first CSI data;
determining a second number of subcarriers reflected in the calibrated second CSI data;
determining a shared multiple of the first and second number; and
upsampling the first CSI data and the calibrated second CSI data to the shared multiple, comprising inserting one or more defined values between subcarriers.

10. A non-transitory computer-readable medium containing computer program code that, when executed by operation of one or more computer processors, performs an operation comprising:
collecting first channel state information (CSI) data for a first link of a plurality of links in a multi-link operation (MLO) system;
collecting second CSI data for a second link of the plurality of links;
estimating a set of channel parameters for the second link, based on the second CSI data, using a channel propagation model;
generating first predicted CSI data for the first link, based on the estimated set of channel parameters for the second link, using the channel propagation model;
calibrating the first CSI data based on the first predicted CSI data, comprising determining at least one of (i) an amplitude difference or (ii) a phase difference between the first CSI data and the first predicted CSI data;
generating aggregated CSI data based on the calibrated first CSI data and the second CSI data; and
performing at least one of (i) wireless sensing or (ii) wireless ranging based on the aggregated CSI data.

11. The non-transitory computer-readable medium of claim 10, the operation further comprising:
collecting third CSI data for the first link; and
calibrating the third CSI data based on at least one of (i) the amplitude difference or (ii) the phase difference between the first CSI data and the first predicted CSI data.

12. The non-transitory computer-readable medium of claim 10, the operation further comprising:
estimating a second set of channel parameters, based on the first CSI data, using the channel propagation model;
generating second predicted CSI data for the second link based on the estimated second set of channel parameters;
calibrating the second CSI data based on the second predicted CSI data; and
generating the aggregated CSI data based further on the calibrated second CSI data.

13. The non-transitory computer-readable medium of claim 12, the operation further comprising:
comparing at least one (i) an amplitude difference or (ii) a phase difference between the first CSI data and the first predicted CSI data and at least one of (i) an amplitude difference or (ii) a phase difference between the second CSI data and the second predicted CSI data; and
determining whether to perform one or more recalibration operations based on the comparison.

14. The non-transitory computer-readable medium of claim 10, wherein generating the aggregated CSI data comprises:
upsampling the first CSI data and the calibrated second CSI data; and
generating a set of power delay profiles by applying an inverse fast Fourier transform (IFFT) operation to the upsampled first CSI data and the upsampled second CSI data.

15. The non-transitory computer-readable medium of claim 14, wherein upsampling the first CSI data and the calibrated second CSI data comprises:
determining a first number of subcarriers reflected in the first CSI data;
determining a second number of subcarriers reflected in the calibrated second CSI data;

determining a shared multiple of the first and second number; and upsampling the first CSI data and the calibrated second CSI data to the shared multiple, comprising inserting one or more defined values between subcarriers.

16. A system, comprising:

one or more computer processors; and a memory containing a program which when executed by the one or more computer processors performs an operation, the operation comprising:

collecting first channel state information (CSI) data for a first link of a plurality of links in a multi-link operation (MLO) system;

collecting second CSI data for a second link of the plurality of links;

estimating a set of channel parameters for the second link, based on the second CSI data, using a channel propagation model;

generating first predicted CSI data for the first link, based on the estimated set of channel parameters for the second link, using the channel propagation model;

calibrating the first CSI data based on the first predicted CSI data, comprising determining at least one of (i) an amplitude difference or (ii) a phase difference between the first CSI data and the first predicted CSI data;

generating aggregated CSI data based on the calibrated first CSI data and the second CSI data; and performing at least one of (i) wireless sensing or (ii) wireless ranging based on the aggregated CSI data.

17. The system of claim 16, the operation further comprising:

collecting third CSI data for the first link; and calibrating the third CSI data based on at least one of (i) the amplitude difference or (ii) the phase difference between the first CSI data and the first predicted CSI data.

18. The system of claim 16, the operation further comprising:

estimating a second set of channel parameters, based on the first CSI data, using the channel propagation model;

generating second predicted CSI data for the second link based on the estimated second set of channel parameters;

calibrating the second CSI data based on the second predicted CSI data; and generating the aggregated CSI data based further on the calibrated second CSI data.

19. The system of claim 18, the operation further comprising:

comparing at least one (i) an amplitude difference or (ii) a phase difference between the first CSI data and the first predicted CSI data and at least one of (i) an amplitude difference or (ii) a phase difference between the second CSI data and the second predicted CSI data; and determining whether to perform one or more recalibration operations based on the comparison.

20. The system of claim 16, wherein generating the aggregated CSI data comprises:

upsampling the first CSI data and the calibrated second CSI data; and generating a set of power delay profiles by applying an inverse fast Fourier transform (IFFT) operation to the upsampled first CSI data and the upsampled second CSI data.

* * * * *